United States Patent
Kato et al.

(10) Patent No.: US 9,786,919 B2
(45) Date of Patent: *Oct. 10, 2017

(54) CURRENT COLLECTOR, ELECTRODE STRUCTURE, NONAQUEOUS ELECTROLYTE BATTERY AND ELECTRICAL STORAGE DEVICE, AND METHOD FOR PRODUCING CURRENT COLLECTOR

(71) Applicants: UACJ Corporation, Chiyoda-ku, Tokyo (JP); UACJ Foil Corporation, Chuo-ku, Tokyo (JP)

(72) Inventors: Osamu Kato, Chiyoda-ku (JP); Sohei Saito, Chiyoda-ku (JP); Yukiou Honkawa, Chiyoda-ku (JP); Mitsuyuki Wasamoto, Kusatsu (JP); Tsugio Kataoka, Kusatsu (JP); Satoshi Yamabe, Kusatsu (JP)

(73) Assignees: UACJ CORPORATION, Chuo-Ku, Tokyo (JP); UACJ FOIL CORPORATION, Chuo-Ku, Tokyo (JP)

( * ) Notice: Subject to any disclaimer, the term of this patent is extended or adjusted under 35 U.S.C. 154(b) by 158 days.

This patent is subject to a terminal disclaimer.

(21) Appl. No.: 14/399,492

(22) PCT Filed: May 10, 2013

(86) PCT No.: PCT/JP2013/063130
§ 371 (c)(1),
(2) Date: Nov. 6, 2014

(87) PCT Pub. No.: WO2013/172257
PCT Pub. Date: Nov. 21, 2013

(65) Prior Publication Data
US 2015/0118553 A1    Apr. 30, 2015

(30) Foreign Application Priority Data

May 15, 2012 (JP) .................................. 2012-111116

(51) Int. Cl.
*H01M 4/62* (2006.01)
*H01M 4/04* (2006.01)
(Continued)

(52) U.S. Cl.
CPC .............. *H01M 4/625* (2013.01); *H01B 1/24* (2013.01); *H01G 11/28* (2013.01); *H01G 11/68* (2013.01);
(Continued)

(58) Field of Classification Search
USPC ............................................ 429/215; 427/58
See application file for complete search history.

(56) References Cited

U.S. PATENT DOCUMENTS

2008/0220330 A1    9/2008   Hosaka
2011/0305948 A1*  12/2011   Miyatake .............. H01M 2/348
                                                 429/210

(Continued)

FOREIGN PATENT DOCUMENTS

JP    10-050294 A     2/1998
JP    2001-357854 A  12/2001
(Continued)

OTHER PUBLICATIONS

International Search Report mailed Jul. 30, 2013, issued in corresponding International Patent Application No. PCT/JP2013/063130, filed May 10, 2013, 4 pages.
(Continued)

*Primary Examiner* — Osei Amponsah
(74) *Attorney, Agent, or Firm* — Christensen O'Connor Johnson Kindness PLLC; Juan Zheng; Llewellyn Lawson

(57) ABSTRACT

Current collector, an electrode structure, a non-aqueous electrolyte battery, and an electrical storage device having superior shut down function are provided. According to the present invention, a current collector having a resin layer on at least one side of a conductive substrate is provided. Here, thermoplastic resin particles substantially free of a conductive agent are dispersed in a thermosetting resin base material containing the conductive agent to structure the resin layer; a value of mass ratio given by (thermoplastic resin particles)/(conductive agent) is 0.3 to 1.5; and a value given by (average thickness of conductive agent)/(average thickness of thermoplastic resin particles) is 0.3 to 4.0.

14 Claims, 2 Drawing Sheets

(51) Int. Cl.
  *H01M 4/66* (2006.01)
  *H01G 11/28* (2013.01)
  *H01G 11/68* (2013.01)
  *H01G 11/70* (2013.01)
  *H01B 1/24* (2006.01)
  *H01M 2/34* (2006.01)
  *H01M 10/052* (2010.01)

(52) U.S. Cl.
  CPC .......... *H01G 11/70* (2013.01); *H01M 2/348* (2013.01); *H01M 4/0404* (2013.01); *H01M 4/0471* (2013.01); *H01M 4/661* (2013.01); *H01M 4/666* (2013.01); *H01M 4/667* (2013.01); *H01M 4/668* (2013.01); *H01M 4/663* (2013.01); *H01M 10/052* (2013.01); *H01M 2200/106* (2013.01); *Y02E 60/13* (2013.01)

(56) References Cited

U.S. PATENT DOCUMENTS

| | | | | |
|---|---|---|---|---|
| 2012/0052378 | A1* | 3/2012 | Torata | H01M 4/13 429/209 |
| 2012/0208082 | A1* | 8/2012 | Honda | H01M 4/60 429/210 |

FOREIGN PATENT DOCUMENTS

| | | |
|---|---|---|
| JP | 2005-294024 A | 10/2005 |
| JP | 2006-190649 A | 7/2006 |
| JP | 2010-123421 A | 6/2010 |
| JP | 2011-060559 A1 | 3/2011 |
| WO | 00/19552 A1 | 4/2000 |
| WO | 2005/101550 A1 | 10/2005 |
| WO | 2006/061696 A2 | 6/2006 |
| WO | 2010/103874 A1 | 9/2010 |

OTHER PUBLICATIONS

Partial Supplementary European Search Report mailed Jan. 25, 2016, issued in corresponding International Application No. PCT/JP2013/063130, filed May 10, 2013, 7 pages.

* cited by examiner

[FIG. 1]
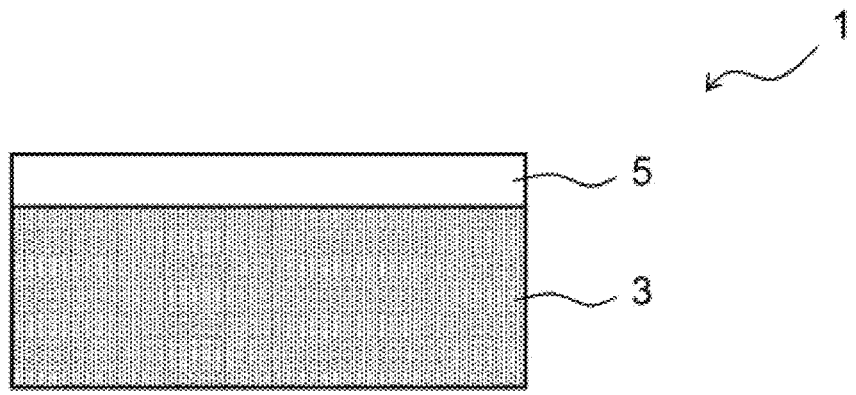
[FIG. 2]
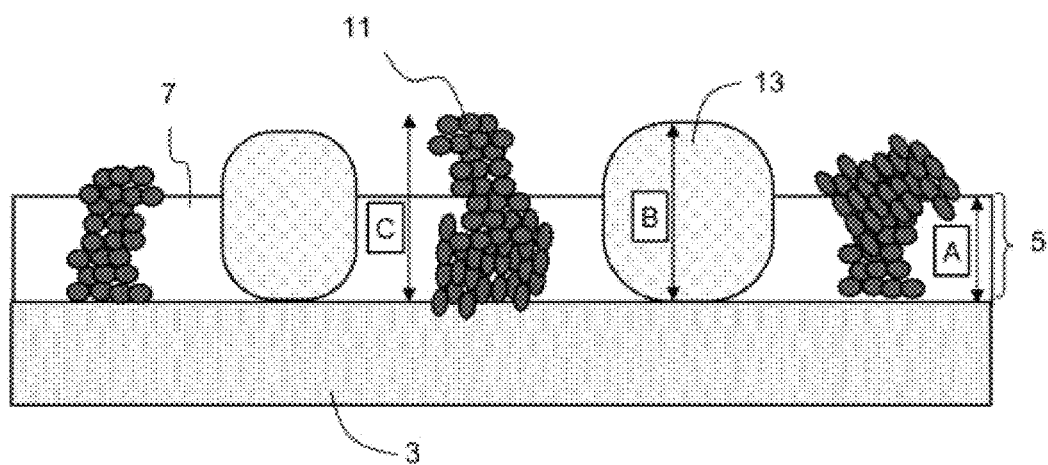
[FIG. 3]
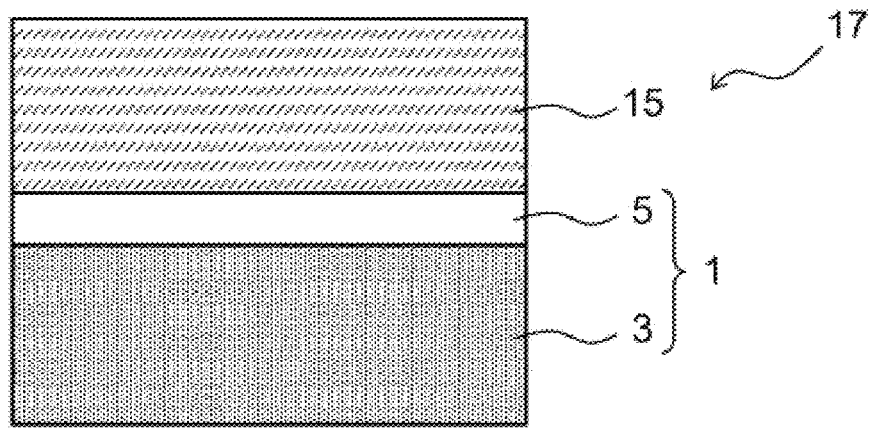

[FIG. 4]
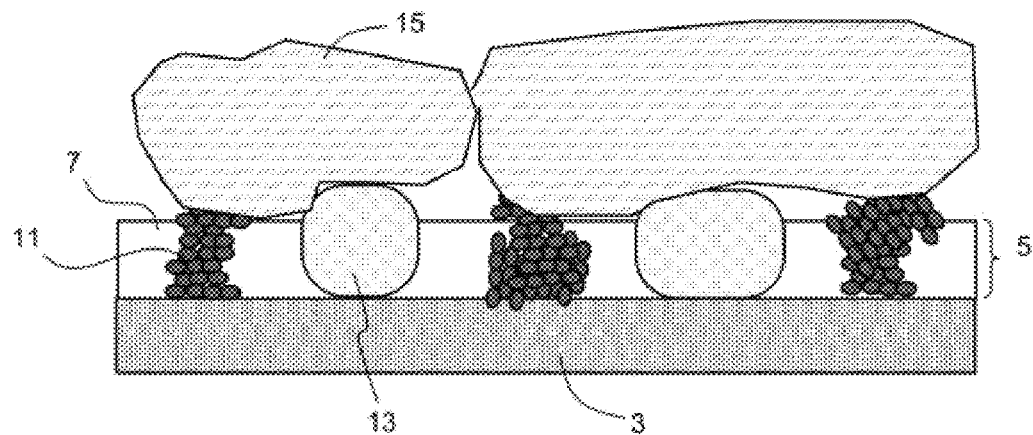
[FIG. 5]
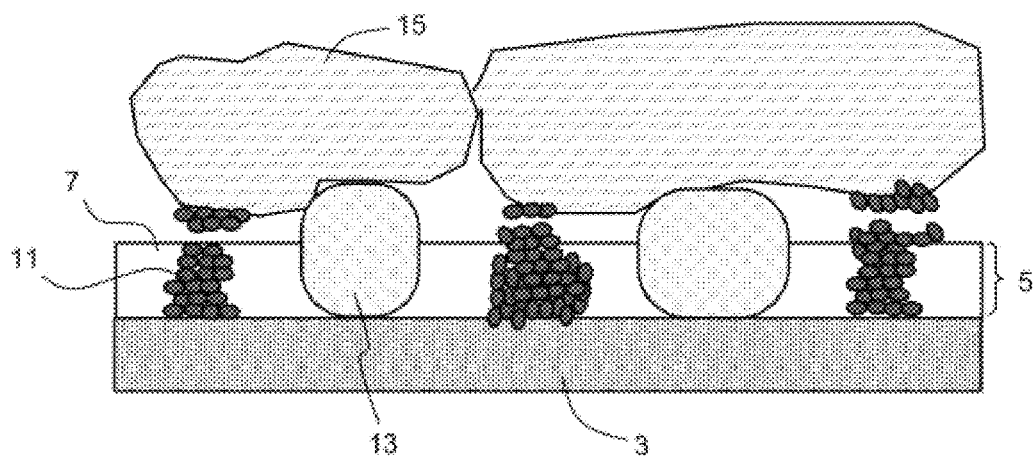

CURRENT COLLECTOR, ELECTRODE STRUCTURE, NONAQUEOUS ELECTROLYTE BATTERY AND ELECTRICAL STORAGE DEVICE, AND METHOD FOR PRODUCING CURRENT COLLECTOR

TECHNICAL FIELD

The present invention relates to current collectors, electrode structures, non-aqueous electrolyte batteries, and electrical storage devices (electrical double layer capacitors, lithium ion capacitors, and the like) having high safety; and manufacturing method thereof.

BACKGROUND

Regarding lithium ion batteries in the vehicle and the like, a property (so-called a shut down function) to automatically and safely terminate discharge and charge of the battery when an accident such as malfunction occurs, has been required. In the battery, the separator is provided with such property. Usually, the separator is designed so that when the temperature is approximately 110 to 140° C., the separator fuses to block micropores, thereby blocking Li ions, leading to termination of the electrode reaction under over-heated circumstances. However, there are cases where the shut down by the separator is incomplete and thus the temperature increases to above the melting point of the separator, and cases where the temperature increase in the external surroundings result in the meltdown of the separator. Such cases would result in an internal short-circuit. Then, the shut down function of the separator can no longer be counted on, and the battery would be in the state of thermal runaway. In order to deal with such circumstances, a technique to form a positive temperature coefficient resistor on the current collector, has been suggested.

For example, as a technique to form the positive temperature coefficient resistor on the current collector, Patent Literature 1 discloses a technique in which the surface of the current collector is coated with a conductive layer comprising a crystalline thermoplastic resin having a function as the positive temperature coefficient resistor, a conductive agent, and a binding agent. Here, the function as the positive temperature coefficient resistor is the function where the resistance value increases along with the increase in temperature. According to such technique, when the temperature inside the battery reaches the melting point of the crystalline thermoplastic resin by the heat generated due to the overcharge of the battery, the resistance of the conductive layer rises sharply, thereby cutting off the current which is flowing through the current collectors to realize the shut down function.

In addition, in Patent Literature 2, a fuse element realized by the arrangement of insulating elastic particles in between the electrodes in an elastically deformed state, is disclosed. When heat exceeding the glass transition temperature is applied, the elastic deformation is released to apart the electrodes, thereby cutting the conduction.

CITATION LIST

Patent Literature

Patent Literature 1: JP 2001-357854A
Patent Literature 2: JP 2010-123421A

SUMMARY OF THE INVENTION

Technical Problem

The technique disclosed in Patent Literature 1 can realize the shut down function to some extent; however, it is still insufficient for practical use. Accordingly, enhancement of the shut down function is desired.

In the technique disclosed in Patent Literature 2, the fuse element cannot be re-used once the elastic deformation is released, and thus it is practically inconvenient. In this technique, the insulating elastic particles are maintained in an elastically deformed state by pressurizing the insulating elastic particles sandwiched in between the electrodes, heating the particles in such state to above the glass transition temperature of the surrounding matrix resin, and then cooling the particles. Here, since the current collector is not provided with a pair of electrodes, it is difficult to apply this technique to the current collector.

The present invention has been made by taking the afore-mentioned circumstances into consideration. An object of the present invention is to provide current collectors, electrode structures, non-aqueous electrolyte batteries, and electrical storage devices that can be manufactured with ease and have a shut down function with high safety, and to provide a manufacturing method of the current collector.

Solution to Problem

By using the current collectors described hereinafter, non-aqueous electrolyte batteries and electrical storage devices that can be manufactured with ease and have a superior shut down function can be obtained.

That is, according to the present invention, a current collector having a resin layer on at least one side of a conductive substrate, wherein: thermoplastic resin particles substantially free of a conductive agent are dispersed in a thermosetting resin base material containing the conductive agent to structure the resin layer; a value of mass ratio given by (thermoplastic resin particles)/(conductive agent) is 0.3 to 1.5; and a value given by (average thickness of conductive agent)/(average thickness of thermoplastic resin particles) is 0.3 to 4.0, is provided.

In order to achieve the shut down function in the non-aqueous electrolyte batteries and the like, the present inventors have conducted extensive studies. Accordingly, the present inventors have found that the constitution of Patent Literature 1 resulted in cases where the shut down function was not appropriately achieved, and that the constitution of Patent Literature 2 was difficult to apply for the current collector. As a result, the inventors have conceived of a resin layer comprising a thermosetting resin base material having thermoplastic resin particles dispersed therein, the thermoplastic resin particles being substantially free of a conductive agent. Such resin layer was considered as a constitution capable to be applied for the current collector and to appropriately achieve a shut down function. When such constitution was actually tested, manufacture of the constitution was comparatively easy. In addition, the thermoplastic resin particles expanded with the increase in temperature, and the conductive agent became apart from each other, obtaining insulating property, thereby achieving the shut down function. When the study was further pursued, it was found that only when the value of the mass ratio given by (thermoplastic resin particles)/(conductive agent) and the value given by (average thickness of conductive agent)/ (average thickness of thermoplastic resin particles) were within a specific range, the resin layer showed low resistance at ambient temperature and achieved appropriate shut down function at elevated temperature, and also showed superior solvent resistance. Accordingly, the present invention was completed.

The present invention utilizes the difference in the thermal expansion coefficient between the thermosetting resin base material containing the conductive agent and the thermoplastic resin particles substantially free of the conductive agent. Accordingly, it is not necessary to arrange the insulating elastic particles in an elastically deformed state as in Patent Literature 2, and thus it can be easily applied for the current collector.

Hereinafter, various embodiments of the present invention will be provided. The following embodiments can be adopted in combination.

Preferably, a value given by (average thickness of conductive agent)/(average thickness of thermosetting resin base material) is 1.0 to 3.0.

Preferably, the thermoplastic resin particles are water-insoluble.

Preferably, a value given by (average thickness of thermoplastic resin particles)/(average thickness of thermosetting resin base material) is 1.0 to 3.0.

Preferably, a value of mass ratio given by (conductive agent)/(thermosetting resin base material) is 0.1 to 0.5.

Preferably, a value of mass ratio given by (thermoplastic resin particles)/(thermosetting resin base material) is 0.09 to 0.4.

Preferably, the thermosetting resin base material is formed from a resin composition comprising a thermosetting resin, a hardening agent, and a conductive agent.

Preferably, the thermosetting resin is a mixture or a copolymer containing at least one type of resin selected from the group consisting of a polyacrylic acid-based resin, a nitrocellulose-based resin, and a chitosan-based resin.

Preferably, the conductive agent comprises carbon black.

Preferably, the thermoplastic resin particles are one or more types of resin selected from the group consisting of polyethylene-based resin, polypropylene-based resin, polyvinylidene fluoride-based resin, polyvinyl butyral-based resin, and modified resins thereof.

According to another aspect of the present invention, an electrode structure comprising an active material layer or an electrode material layer on the resin layer of the aforementioned current collector, and a non-aqueous electrolyte battery or an electrical storage device comprising the electrode structure, are provided.

According to further another aspect of the present invention, a method for manufacturing a current collector, comprising the steps of: applying a resin layer material on at least one side of a conductive substrate; and baking the resin layer material at 120 to 230° C.; wherein the resin layer material comprises: a thermosetting resin solution containing a thermosetting resin, a hardening agent and a conductive agent; and thermoplastic resin powder dispersed in the thermosetting resin solution, is provided.

Preferably, the resin layer material is prepared by a method comprising the steps of: (1) preparing an aqueous emulsion of the thermosetting resin; (2) mixing the emulsion with the conductive agent; (3) further adding the emulsion to the mixture obtained by step (2); (4) adding the thermoplastic resin powder to the mixture obtained by step (3); and (5) adding the hardening agent to the mixture obtained by step (4); wherein the conductive agent is added so that a value of mass ratio given by (conductive agent)/(thermosetting resin+hardening agent+conductive agent) is 0.1 to 0.5.

BRIEF DESCRIPTION OF THE DRAWINGS

FIG. 1 is a cross-sectional view showing a structure of the current collector according to one embodiment of the present invention.

FIG. 2 is a cross-sectional view showing a precise structure of the resin layer of the current collector at ambient temperature according to one embodiment of the present invention.

FIG. 3 is a cross-sectional view showing a structure of the electrode structure structured by using the current collector according to one embodiment of the present invention.

FIG. 4 is a cross-sectional view showing the state of the electrode structure at ambient temperature after forming the active material layer on the current collector of FIG. 2.

FIG. 5 is a cross-sectional view showing the state of the electrode structure of FIG. 4 at elevated temperature.

DESCRIPTION OF EMBODIMENTS

1. Current Collector

Hereinafter, the embodiment of the present invention will be described with reference to FIG. 1 to FIG. 5.

As shown in FIG. 1 to FIG. 2, the current collector 1 of the present invention is structured by providing a resin layer having conductivity (resin layer for current collector) 5 on at least one side of the conductive substrate 3. The thermoplastic resin particles 13 substantially free of the conductive agent 11 is dispersed in the thermosetting resin base material 7 containing the conductive agent 11 to give the resin layer 5. In FIG. 2, each of the arrows identified by A, B, and C shows the thickness of the thermosetting resin base material, thermoplastic resin particle, and conductive agent, respectively. As apparent from FIG. 2, the thickness of the thermosetting resin base material 7 is the thickness of the resin layer at the portion where the thermoplastic resin particle 13 and the conductive agent 11 do not exist.

In addition, as shown in FIG. 3, on the resin layer 5 of the current collector 1 of the present invention, the active material layer or the electrode material layer 15 is formed, so as to construct an electrode structure 17 suitable for a non-aqueous electrolyte battery such as a lithium ion battery, an electrical double layer capacitor, or a lithium ion capacitor.

Hereinafter, each of the components will be described in detail.

(1) Conductive Substrate

As the conductive substrate of the present invention, various types of metal foils for the usage in non-aqueous electrolyte batteries, electrical double layer capacitors, or lithium ion capacitors can be used. Specifically, various metal foils for positive electrodes and negative electrodes, such as foils of aluminum, aluminum alloy, copper, stainless steel, nickel and the like can be used for example. Among these, from the viewpoint of the balance between high electrical conductivity and cost, aluminum, aluminum alloy, and copper are preferable. There is no particular limitation with respect to the thickness of the conductive substrate. Here, it is preferable that the thickness is 5 μm or more and 50 μm or less. When the thickness is less than 5 μm, the strength of the foil would be insufficient, and thus it becomes difficult to form the resin layer and the like. When the thickness exceeds 50 μm, the other components, particularly the active material layer or the electrode material layer need be thinned. In particular, when non-aqueous electrolyte batteries and electrical storage devices such as electrical double layer capacitors or lithium ion capacitors are being made, the active material layer need be thinned, thereby leading to cases where the capacity becomes insufficient.

(2) Resin Layer

In the present invention, a resin layer 5 is formed on the conductive substrate 3. Regarding the usage as the positive electrode, it is preferable that the resin layer 5 of the present invention is structured separately from the active material layer. As such, the adhesion between the conductive substrate and the active material layer can be improved. In addition, the shut down function can be obtained, and thus the current collector can suitably be used in the manufacture of the non-aqueous electrolyte battery, electrical storage device and the like having superior safety.

The resin layer 5 of the present invention is made by dispersing the thermoplastic resin particles 13 substantially free of the conductive agent, in the thermosetting resin base material 7 containing the conductive agent 11.

There is no particular limitation regarding the thickness of the resin layer 5. Here, the thickness is preferably 0.3 to 20 μm. When the thickness is less than 0.3 μm, the resistance cannot be decrease sufficiently at over-heated circumstances, resulting in cases where the shut down function is not achieved. When the thickness exceeds 20 μm, the resistance at normal circumstances would become high, resulting in the decrease of high-rate characteristics. Examples of the thickness of the resin layer 5 are 0.3, 0.5, 1, 2, 5, 10, 15, and 20 μm, and may be in the range of two values selected from the values exemplified herein.

<Thermosetting Resin Base Material>

The thermosetting resin base material 7 can be formed by heating a resin composition containing a thermosetting resin, a hardening agent, and a conductive agent 11, thereby hardening the resin composition. The resin composition can be prepared by mixing the conducting agent and the hardening agent into an aqueous solution containing an aqueous emulsion of the thermosetting resin (obtained by dissolving the thermosetting resin in an organic solvent, followed by dispersing the mixture thus obtained in water containing surfactant). The thermosetting resin is not particularly limited, so long as it hardens when allowed to react with a hardening agent. Examples of the thermosetting resin include a mixture or a copolymer containing at least one type selected from the group consisting of a polyacrylic acid-based resin, a nitrocellulose-based resin, and a chitosan-based resin. One example is a polyacrylic acid-polyacrylic acid ester copolymer.

In the present invention, the polyacrylic acid-based resin is a resin formed from monomers containing acrylic acid, methacrylic acid, or derivatives thereof as the main component. Specific examples include a mixture or a copolymer containing at least one type selected from the group consisting of a polyacrylic acid, a polyacrylic acid ester, a polymethacrylic acid, and a polymethacrylic acid ester. In addition, the polyacrylic acid-based resin may contain a copolymer with hydroxyacrylic acid ester resin or polyacrylonitrile resin, in addition to one or more type of resin selected from the group consisting of a polyacrylic acid, a polyacrylic acid ester, a polymethacrylic acid, and a polymethacrylic acid ester.

In the present invention, the nitrocellulose-based resin is a resin containing nitrocellulose as the resin component. Here, it may contain only the nitrocellulose, or may contain a resin other than the nitrocellulose. The nitrocellulose is one type of cellulose which is a polysaccharide, and is characterized by possessing a nitro group. Although nitrocellulose is a cellulose having a nitro group, in contrast with other celluloses such as CMC and the like, the nitrocellulose is not widely used in electrodes, and have been conventionally used as a raw material of resin film or coatings. The nitrogen density of the soluble nitrocellulose used in the present invention is 10 to 13%, especially preferably 10.5 to 12.5%. When the nitrogen density is too low, dispersion may not be sufficient depending on the type of conductive agent. When the nitrogen density is too high, the soluble nitrocellulose becomes chemically unstable, which would be dangerous when used for batteries. The nitrogen density depends on the number of nitro group, and thus the nitrogen density can be adjusted by adjusting the number of the nitro group. In addition, the viscosity of the soluble nitrocellulose is usually in the range of 1 to 6.5 second, preferably 1.0 to 6 seconds when observed by JIS K-6703. The acid content is preferably 0.006% or lower, especially preferably 0.005% or lower. When these values are not in such range, dispersibility of the conductive agent and the battery characteristics may degrade.

In the present invention, the chitosan-based resin is a resin including a chitosan derivative as the resin component. As the chitosan-based resin, a resin including a chitosan derivative by 100 mass % can be used, however, other resin component can be used in combination. When the other resin is used in combination, it is preferable that the chitosan derivative is contained by 50 mass % or higher, more preferably 80 mass % or higher with respect to the total resin component. As the chitosan derivative, for example, hydroxy alkyl chitosan, hydroxyl ethyl chitosan, hydroroxy propyl chitosan, hydroxyl butyl chitosan, and grycerylated chitosan can be mentioned, and grycerylated chitosan is particularly preferable. The chitosan-based resin preferably contains an organic acid. As the organic acid, pyromellitic acid, terephthalic acid and the like can be mentioned. The amount of the organic acid added is preferably 20 to 300 mass % with respect to the 100 mass % of the chitosan derivative, and is more preferably 50 to 150 mass %. When the amount of organic acid added is too small, the hardening of the chitosan derivative becomes insufficient. When the amount of organic acid added is too large, flexibility of the resin layer degrades.

There is no particular limitation for the type of the hardening agent, so long as it can harden the thermosetting resin by cross-linking. For example, melamine or derivatives thereof, blocked urea and the like can be mentioned. Derivatives of melamine can be obtained by forming a methylol group via condensation reaction of melamine and formaldehyde (further addition reaction may be carried out for obtaining polynuclear compounds), and then alkylating the methylol group with alcohol (example: methyl alcohol or butyl alcohol) when necessary. As the derivatives of melamine, a fully-alkylated type having almost all of its methylol group alkylated, an imino type having many remaining hydrogen groups that are not converted into methylol groups, and a methylol type having many methylol groups that are not alkylated, can be mentioned for example. In the present invention, it is preferable to use the fully-alkylated type melamine. The fully-alkylated melamine does not have a methylol group nor an imino group, but has methylol groups that are completely etherified generally with C1 to C4 mono-valent alcohols, such as methanol, n-butanol, isobutanol and the like. The average degree of condensation of the fully-alkylated melamine is 2 or lower. When the fully-alkylated melamine is used, flexibility of the resin layer 5 can be improved, and the adhesion with the active material layer after pressing can be improved. Specific examples of the derivative of melamine are trimethoxy methyl melamine and hexamethoxy methyl melamine.

Blocked urea can be obtained by first preparing a methylol urea by condensation reaction of urea with formaldehyde, and then allowing the resulting methylol urea to react with a blocking agent such as alcohol (example: methyl alcohol or butyl alcohol).

As the conductive agent 11 used in the present invention, known carbon powders, metal powders and the like can be used. Among them, carbon black such as furnace black, acetylene black, Ketjen black and the like are preferable. The average thickness of the conductive agent 11 is not particularly limited. Here, the value given by (average thickness of conductive agent 11)/(average thickness of thermosetting resin base material 7) is preferably 1.0 to 3.0. When this value is too small, it would become difficult for the conductive agent 11 in the resin layer 5 to come in contact with the active material, resulting in increase in the resistance at ambient temperature. On the other hand, when this value is too large, it becomes difficult for the particles of the conductive agent 11 to apart even at elevated temperature, making it difficult to achieve the shut down function. The average thickness of the conductive agent 11 can be obtained from the image of the cross-section of the coating prepared by ultramicrotome or ion milling, the image being taken by SEM (field emission-type scanning electron microscope). Here, when the shape of the particle are indistinct, EDX (energy dispersive X-ray Spectroscopy) can be carried out simultaneously with the SEM observation, thereby taking an image of at least the carbon and oxygen for measurement. Since the conductive agent contains only carbon, the thermosetting resin film contains components derived from functional groups and hardening agent (oxygen, nitrogen and the like), the shape of the particle can be determined.

The formulation amount of the conductive agent 11 is not particularly limited. Here, the value of the mass ratio given by (conductive agent 11)/(thermosetting resin base material 7) is preferably 0.1 to 0.5. When the formulation amount of the conductive agent 11 is too small, the number of contacting points of the particles of the conductive agent 11 would be small, resulting in high electrical resistance at ambient temperature. On the other hand, when the formulation amount of the conductive agent 11 is too large, the particles of the conductive agent 11 would be still in contact with each other even at elevated temperature, making it difficult to achieve the shut down function. Here, when the mass of the thermosetting resin base material 7 is calculated from the mass of the raw material, it is given by (mass of total thermosetting resin+mass of hardening agent+mass of conductive agent).

<Thermoplastic Resin Particle>

The thermoplastic resin particles 13 are dispersed in the thermosetting resin base material 7. The thermoplastic resin particles 13 consist essentially of a thermoplastic resin, and is substantially free of the conductive agent 11. The term "substantially free of" means that inclusion of the conductive agent 11 by a small amount to an extent which does not form a conductive pathway in the thermoplastic resin particles 13 are permissible. For example, the mass ratio given by (conductive agent 11)/(thermoplastic resin particles 13) is 0.02 or lower, preferably 0.01 or lower. Since the thermoplastic resin particles 13 are substantially free of the conductive agent, there is no conductive pathway via the thermoplastic resin particles 13. In addition, since the thermal expansion coefficient of the conductive agent is usually smaller than the thermal expansion coefficient of the resin, the thermal expansion coefficient of the thermoplastic resin particles 13 substantially free of the conductive agent tends to be larger than the thermal expansion coefficient of the thermosetting resin base material 7 containing the conductive agent. Therefore, when the temperature of the resin layer 5 having the active material layer 15 formed thereon is raised, the thermoplastic resin particles 13 would expand largely, thereby shifting the state of the resin from the one shown in FIG. 4 to FIG. 5. Accordingly, the particles of the conductive agent 11 would be apart, cutting the conductive pathway, and thus the shut down function will be effectively achieved.

The value of the mass ratio given by (thermoplastic resin particles 13)/(conductive agent 11) is 0.3 to 1.5. When this value is too small, the amount of the thermoplastic resin particles would be too small with respect to the amount of the conductive agent. In such case, not all of the connection between the conductive agent would be cut even when the thermoplastic resin particles expand. On the other hand, when this value is too large, the amount of the conductive agent would be too small, leading to high electrical resistance.

Here, the value given by (average thickness of conductive agent 11)/(average thickness of thermoplastic resin particles 13) is 0.3 to 4.0. When this value is too small, it would be difficult for the active material layer 15 and the resin layer 5 to come in contact with each other, resulting in high resistance. On the other hand, when this value is too large, the amount of the conductive agent 11 would be too large, resulting in cases where not all of the connection between the conductive agent 11 is cut even when the thermoplastic resin particles 13 expand. Accordingly, the shut down function is not appropriately achieved.

The value given by (average thickness of thermoplastic resin particles 13)/(average thickness of thermosetting resin base material 7) is preferably 1.0 to 3.0. When this value is too small, the shut down function would become insufficient. On the other hand, when this value is too large, the adhesion between the resin layer and the substrate, and the solvent resistance of the resin layer would become insufficient.

The value of the mass ratio given by (thermoplastic resin particles 13)/(thermosetting resin base material 7) is 0.09 to 0.4. When this value is too small, the shut down function tends to become insufficient. On the other hand, when this value is too large, the area of the thermosetting resin portion would become small, resulting in insufficient coating adhesion and decrease in solvent resistance.

The thermoplastic resin of the present invention is not particularly limited, so long as it can achieve the shut down function by heat expansion with the afore-mentioned principle. Here, from the viewpoint of the ease for forming the resin layer, water-insoluble resins are preferable. Examples of the thermoplastic resin include one or more type of resin selected from the group consisting of polyethylene-based resin, polypropylene-based resin, polyvinylidene fluoride-based resin, polyvinyl butyral-based resin, and modified resins thereof.

2. Manufacturing Method of Current Collector

The manufacturing method of the current collector of the present invention comprises the steps of: applying a resin layer material on at least one side of a conductive substrate 3; and baking the resin layer material at 120 to 230° C.; wherein the resin layer material comprises: a thermosetting resin solution containing a thermosetting resin, a hardening agent and a conductive agent; and thermoplastic resin powder dispersed in the thermosetting resin solution.

More specifically, the resin layer material is prepared by a method comprising the steps of:

(1) preparing an aqueous emulsion of the thermosetting resin;
(2) mixing the emulsion with the conductive agent;
(3) adding the emulsion to the mixture obtained by step (2);
(4) adding the thermoplastic resin powder to the mixture obtained by step (3); and
(5) adding the hardening agent to the mixture obtained by step (4); wherein
the conductive agent is added so that a value of mass ratio given by (conductive agent)/(thermosetting resin+hardening agent+conductive agent) is 0.1 to 0.5.

Hereinafter, details are provided.

First, an aqueous emulsion of the thermosetting resin is prepared. The aqueous emulsion is, for example, prepared by dissolving the thermosetting resin in an organic solvent, and then dispersing the solution thus obtained in water containing a surfactant.

Next, a part of the emulsion prepared and the conductive agent are mixed and agitated. When the whole amount of the emulsion and the conductive agent are mixed, there are cases where the conductive agent cannot appropriately be dispersed. Therefore, a comparatively small amount of the emulsion and the conductive agent are mixed and agitated to give a sufficiently dispersed conductive agent, and then the emulsion is further added.

In addition, the conductive agent is added so that the value of the mass ratio given by (conductive agent)/(thermosetting resin+hardening agent+conductive agent) is 0.1 to 0.5. When the amount of the conductive agent is too small, the resistance at ambient temperature would become high. On the other hand, when the amount of the conductive agent is too large, it becomes difficult to achieve the shut down function appropriately.

From the afore-described procedure, the conductive agent would be sufficiently dispersed in an appropriate amount of the aqueous emulsion. In such state, the thermoplastic resin powder is added and sufficiently dispersed. It is preferable that the thermoplastic resin powder is added in a dry condition. Here, the powder may be added in a condition where the powder is dispersed in a medium such as water.

Then, the hardening agent is added to the mixture solution thus obtained. The hardening agent is added so that the value of the mass ratio of solid content given by (hardening agent)/(thermosetting resin) is 0.02 to 0.5.

Accordingly, the resin layer material is obtained.

In the afore-mentioned method, the hardening agent was added after adding the thermoplastic resin powder, however, the hardening agent may be added before the thermoplastic resin powder.

Next, the resin layer material is applied onto the conductive substrate, followed by baking at 120 to 230° C. By carrying out the baking procedure at such temperature, water will volatize, and the thermosetting resin and the hardening agent would react to harden, thereby providing a current collector as shown in FIG. 1 to FIG. 2. Examples of the baking temperature include 120, 130, 140, 150, 160, 170, 180, 190, 200, 210, 220, and 230° C., and may be in the range of two values selected from the values exemplified herein.

When coating, a roll coater, a gravure coater, a slit dye coater and the like can be used, and is not limited to these. The baking time is not particularly limited. Here the baking time is 60 to 240 seconds for example.

3. Electrode Structure

By forming an active material layer or an electrode material layer on at least one side of the current collector of the present invention, the electrode structure of the present invention can be obtained. The electrode structure for the electrical storage device formed with the electrode material layer will be described later. First, in the case of an electrode structure with an active material layer formed thereon, this electrode structure can be used with a separator, non-aqueous electrolyte solution and the like to manufacture an electrode structure (including parts for batteries) for a non-aqueous electrolyte battery, such as a lithium ion secondary battery. In the electrode structure for the non-aqueous electrolyte battery and the non-aqueous electrolyte battery of the present invention, conventional parts for non-aqueous electrolyte battery can be used for the parts other than the current collector.

Here, in the present invention, the active material layer formed as the electrode structure may be the ones conventionally proposed for the non-aqueous electrolyte battery. For example, positive electrode structure of the present invention can be obtained by coating the current collector of the present invention which uses aluminum with a paste, followed by drying. Here, the paste for the positive electrode structure is obtained by using $LiCoO_2$, $LiMnO_2$, $LiNiO_2$ and the like as an active material and using carbon black such as acetylene black and the like as conductive agent, and dispersing the conductive agent and the conductive material in PVDF as a binder or in the water dispersion type PTFE.

The negative electrode structure of the present invention can be obtained by coating an active material layer forming material in the form of a paste, followed by drying. The current collector for the negative electrode of the present invention uses copper. Here, the paste for the negative electrode structure is obtained by using black lead, graphite, mesocarbon microbead and the like as an active material, dispersing the active material in CMC as a thickening agent, and then mixing the resulting dispersion with SBR as a binder.

4. Non-Aqueous Electrolyte Battery

The present invention may be a non-aqueous electrolyte battery. In such case, there is no particular limitation except that the current collector of the present invention is used. For example, the non-aqueous electrolyte battery of the present invention can be obtained by sandwiching a separator immersed in an electrolyte solution for non-aqueous electrolyte battery containing non-aqueous electrolyte, in between the afore-mentioned positive electrode structure and the negative electrode structure having the current collector of the present invention as a constructing component. As the non-aqueous electrolyte and the separator, the conventional ones for the non-aqueous electrolyte battery can be used. The electrolyte solution can use carbonates, lactones or the like as a solvent. For example, $LiPF_6$ or $LiBF_4$ as an electrolyte can be dissolved in a mixture of EC (ethylene carbonate) and EMC (ethyl methyl carbonate) and used. As the separator, a membrane made of polyolefin having microporous can be used for example.

5. Electrical Storage Device (Electrical Double Layer Capacitor, Lithium Ion Capacitor and the Like)

In general, the electrical double layer capacitor and the like are high in safety compared with the secondary battery. Here, in view of improving the high rate characteristics, the current collector of the present invention can be applied. The current collector of the present invention can be applied to an electrical storage device such as an electrical double layer capacitor, lithium ion capacitor and the like, which require charge and discharge with a large current density at high speed. The electrode structure for the electrical storage device of the present invention can be obtained by forming an electrode material layer on the current collector of the present invention. The electrical storage device such as the electrical double layer capacitor, lithium ion capacitor and the like can be manufactured with the electrode structure thus obtained, a separator, and an electrolyte solution. In the electrode structure and the electrical storage device of the present invention, conventional parts for the electrical double layer capacitor and lithium ion capacitor can be used for the parts other than the current collector.

The electrode material layers of the positive electrode and the negative electrode can both be structured with an electrode material, a conductive agent, and a binder. In the present invention, the electrode structure is obtained by forming the afore-mentioned electrode material layer onto at least one side of the current collector of the present invention, and then the electrical storage device is obtained. Here, as the electrode material, the ones conventionally used as the electrode material for the electrical double layer capacitor or for the lithium ion capacitor, can be used. For example, carbon powders such as activated charcoal and graphite (black lead), and carbon fibers can be used. As the conductive agent, carbon blacks such as acetylene black and the like can be used. As the binder, PVDF (polyvinylidene fluoride) SBR (styrene butadiene rubber), and water dispersion type PTFE can be used for example. In addition, the electrical storage device of the present invention can construct an electrical double layer capacitor or a lithium ion capacitor by fixing a separator in between the electrode structures of the present invention, and then immersing the separator in the electrolyte solution. As the separator, a membrane made of polyolefin having microporous, a non-woven fabric for an electrical double layer capacitor, and the like can be used for example. Regarding the electrolyte solution, carbonates and lactones can be used as the solvent for example, and tetraethylammonium salt, triethylmethylammonium salt and the like can be used as the electrolyte, and hexafluorophosphate, tetrafluoroborate and the like can be used as the negative ion. Lithium ion capacitor is structured by combining a negative electrode of a lithium ion battery and a positive electrode of an electrode double layer capacitor. There is no particular limitation with respect to the manufacturing method and known methods can be adopted, except that the current collector of the present invention is used.

EXAMPLES

Hereinafter, the present invention will be described in detail with reference to Examples. However, the Examples are merely an exemplification, and the present invention shall not be limited to these Examples.

The current collectors for Examples and Comparative Examples were prepared in accordance with the following method, and various evaluations were conducted. The conditions for preparation and the results of the evaluation are provided in Table 1. In Table 1, "parts by mass" means parts by mass of the solid content for all cases.

TABLE 1

| | | | Example | | | | | | | | | | Comparative Example | | | | | | |
|---|---|---|---|---|---|---|---|---|---|---|---|---|---|---|---|---|---|---|---|
| | | | 1 | 2 | 3 | 4 | 5 | 6 | 7 | 8 | 9 | 10 | 1 | 2 | 3 | 4 | 5 | 6 | 7 |
| thermoplastic resin powder | polyethylene (parts by mass) | | 50 | 50 | 50 | 50 | 50 | 50 | 50 | 25 | 95 | 50 | 50 | 50 | 50 | 50 | 14 | 150 | 50 |
| | average particle diameter (μm) | | 1.1 | 2.8 | 1.1 | 1.1 | 1.1 | 4.4 | 0.6 | 1.1 | 1.1 | 1.1 | 1.1 | 1.1 | 0.2 | 5.5 | 1.1 | 1.1 | 1.1 |
| thermosetting resin | polyacrylic acid-polyacrylic acid ester | initial amount (parts by mass) | 100 | 100 | 100 | 100 | 100 | 100 | 100 | 100 | 100 | 100 | 100 | 100 | 100 | 100 | 100 | 100 | 100 |
| | | addition amount (parts by mass) | 79 | 63 | 79 | 51 | 356 | 79 | 79 | 75 | 75 | 70 | 21 | 285 | 79 | 70 | 75 | 79 | 69 |
| | | total amount (parts by mass) | 179 | 163 | 179 | 151 | 456 | 179 | 179 | 175 | 175 | 170 | 121 | 385 | 179 | 170 | 175 | 179 | 169 |
| conductive agent | acetylene black (parts by mass) | | 79 | 120 | 44 | 84 | 79 | 79 | 79 | 75 | 75 | 70 | 5 | 856 | 79 | 70 | 75 | 79 | 69 |
| hardening agent | hexamethoxy methyl melamine (parts by mass) | | 14 | 13 | 14 | 12 | 37 | 14 | 14 | 14 | 14 | 4 | 10 | 31 | 14 | 14 | 14 | 14 | 2 |
| | thermosetting resin particles/conductive agent | | 0.63 | 0.42 | 1.15 | 0.59 | 0.63 | 0.63 | 0.63 | 0.34 | 1.28 | 0.71 | 10.0 | 0.06 | 0.63 | 0.71 | 0.19 | 1.89 | 0.72 |
| | conductive agent/(thermosetting resin + hardening agent + conductive agent) | | 0.29 | 0.40 | 0.18 | 0.34 | 0.14 | 0.29 | 0.29 | 0.28 | 0.28 | 0.29 | 0.04 | 0.68 | 0.29 | 0.27 | 0.28 | 0.29 | 0.29 |
| | thermosetting resin particles/(thermosetting resin + hardening agent + conductive agent) | | 0.18 | 0.17 | 0.21 | 0.20 | 0.09 | 0.18 | 0.18 | 0.10 | 0.36 | 0.20 | 0.37 | 0.04 | 0.18 | 0.20 | 0.05 | 0.55 | 0.21 |
| | thermosetting resin particles/(thermosetting resin + hardening agent + conductive agent) | | 0.20 | 0.22 | 0.20 | 0.24 | 0.10 | 0.20 | 0.20 | 0.12 | 0.33 | 0.22 | 0.27 | 0.11 | 0.20 | 0.21 | 0.07 | 0.43 | 0.23 |
| | thermosetting resin solution ratio: additional/initial | | 0.79 | 0.63 | 0.79 | 0.51 | 3.56 | 0.79 | 0.79 | 0.75 | 0.75 | 0.70 | 0.21 | 2.86 | 0.79 | 0.70 | 0.75 | 0.79 | 0.69 |
| | hardening agent/thermosetting resin | | 0.08 | 0.08 | 0.08 | 0.08 | 0.08 | 0.08 | 0.08 | 0.08 | 0.08 | 0.03 | 0.08 | 0.08 | 0.08 | 0.08 | 0.08 | 0.08 | 0.01 |
| | baking temperature of resin layer (° C.) | | 160 | 160 | 160 | 160 | 160 | 160 | 160 | 160 | 160 | 160 | 160 | 160 | 160 | 160 | 160 | 160 | 160 |
| | average thickness of conductive agent: C (μm) | | 1.4 | 2.1 | 0.8 | 1.5 | 1.4 | 1.4 | 1.4 | 1.3 | 1.3 | 1.2 | 0.1 | 15.0 | 1.4 | 1.2 | 1.3 | 1.4 | 1.2 |
| | average thickness of thermoplastic resin particles: B (μm) | | 1.0 | 2.5 | 1.0 | 1.0 | 1.0 | 4.0 | 0.5 | 1.0 | 1.0 | 1.0 | 1.0 | 1.0 | 0.2 | 5.0 | 1.0 | 1.0 | 1.0 |
| | average thickness of thermosetting resin base material: A (μm) | | 0.5 | 1.0 | 0.5 | 0.8 | 0.8 | 1.4 | 0.5 | 1.3 | 1.3 | 1.2 | 0.1 | 15.0 | 0.5 | 0.5 | 0.5 | 0.5 | 0.5 |
| | thickness of conductive agent C/thickness of thermoplastic resin particles B | | 1.4 | 0.8 | 0.8 | 1.5 | 1.4 | 0.3 | 2.8 | 1.3 | 1.3 | 1.2 | 0.1 | 15.0 | 6.9 | 0.2 | 1.3 | 1.4 | 1.2 |
| | thickness of conductive agent C/thickness of thermosetting resin base material A | | 2.8 | 2.1 | 1.6 | 1.9 | 1.8 | 1.0 | 2.8 | 2.6 | 2.6 | 2.4 | 0.2 | 30.0 | 2.8 | 2.4 | 2.6 | 2.8 | 2.4 |
| | thickness of thermosetting resin particles B/thickness of thermosetting resin base material A | | 2.0 | 2.5 | 2.0 | 1.3 | 1.3 | 2.9 | 1.0 | 2.0 | 2.0 | 2.0 | 2.0 | 2.0 | 0.4 | 10.0 | 2.0 | 2.0 | 2.0 |
| electrical characteristic | at ambient temperature | resistance (Ω) | 7.0 | 5.0 | 18.0 | 6.0 | 12.0 | 15.0 | 6.0 | 8.0 | 9.0 | 7.0 | 55.0 | 2.6 | 7.0 | 70.0 | 6.0 | 7.0 | 8.0 |
| | at elevated temperature | resistance increase starting temperature (° C.) | 125 | 125 | 125 | 125 | 125 | 125 | 125 | 125 | 125 | 125 | — | 125 | 125 | 125 | — | 125 | 125 |
| | | resistance ratio | 140 | 140 | 110 | 90 | 90 | 140 | 75 | 70 | 135 | 125 | 1 | 4 | 8 | 11 | 1 | 170 | 200 |
| adhesion property of resin layer (by tape peeling) | | | A | A | A | A | A | A | A | A | B | B | A | C | A | C | A | C | C |
| solvent resistance (number of times until change observed) | | | >20 | >20 | >20 | >20 | >20 | >20 | >20 | >20 | 20 | 16 | >20 | 8 | >20 | 8 | >20 | 3 | 4 |

<Preparation of Aqueous Emulsion>

The thermosetting resin shown in Table 1 was dissolved in an organic solvent, and then the resulting solution was dispersed in water containing a surfactant to give the aqueous emulsion (solid content: 30 mass %). Here, since the viscosity of the aqueous solution having the solid content of 30 mass % was rather high, purified water was further added to the thermosetting resin aqueous emulsion to ease the mixing during further addition of substances. Accordingly, an aqueous solution for further addition of substances, the solution having a solid content of 25 mass %, was also prepared.

<Addition of Conductive Agent>

Then, as shown in Table 1, the conductive agent was added to the aqueous emulsion thus obtained, and then the mixture was agitated for 20 minutes using Disper at the rotation number of 3000. Subsequently, the aqueous emulsion was added, and the mixture was agitated for 30 minutes using Disper at the rotation number of 4000.

<Addition of Thermoplastic Resin Powder>

Then, as shown in Table 1, the thermoplastic resin powder is added to the solution mixture thus obtained, and the resulting mixture was agitated for 20 minutes using Disper at the rotation number of 3000. The average particle diameter of the thermoplastic resin powder is the particle diameter at the integrated value of 50% obtained from the particle size distribution measured with the laser diffraction scattering method.

<Addition of Hardening Agent>

Next, as shown in Table 1, the hardening agent is added to the solution mixture obtained, and the mixture was agitated for 20 minutes using Disper at the rotation number of 3000.

<Preparation of Current Collector>

The resin layer material conductive agent was applied on both sides of an aluminum foil having the thickness of 20 μm (JIS A1085) using a bar coater, followed by drying and baking in air heating furnace. Accordingly, the sample of the current collector was prepared. Baking was carried out under air atmosphere, with wind velocity of 1 to 3 m/sec, setting the atmosphere temperature to 160° C., and allowing the current collectors to stand in the furnace for 120 seconds.

<Average Thickness of Conductive Agent>

The average thickness of the conductive agent is obtained by the following manner. The coated sheet was cut using an ultramicrotome to expose the cross section of the coating, and then SEM image (electron microscopy image) was taken by FE-SEM (field emission-type scanning electron microscope). Using the photograph of the cross section, the thickness of the conductive agent was measured for 20 points, and then the average value was taken as the average thickness.

<Measurement of Average Thickness of Thermosetting Resin Base Material and Average Thickness of Thermoplastic Resin Particle>

The thickness of the thermosetting resin base material was obtained by observing the cross section of the resin using FE-SEM. The average thickness of the thermosetting resin base material was obtained as the average value of the thickness measured for 20 points where the thermoplastic resin particle nor the conductive agent exist. In addition, the average thickness of the thermoplastic resin particles was obtained as the average value of the thickness measured for 30 points.

<Electrical Resistance of Resin Layer>

The samples were heated to temperatures ranging from 20° C., elevated by 10 degrees. At each temperature, the sample was sandwiched with gold-plated electrodes, and then the DC amperage at constant voltage was measured to obtain the resistance at each of the electrode temperature. The lowest temperature at which the resistance starts to elevate was taken as the temperature at which the resistance starts to increase (resistance increase starting temperature). In addition, the value obtained by dividing the maximum resistance value with the resistance value at 20° C. was taken as the resistance ratio.

<Measurement of Adhesion Property>

An insulating polyester tape (NP-T tape available from Nitto Denko Corporation) having a width of 10 mm was adhered onto the surface of the sample, and was firmly adhered by pressing with hand. Subsequently, the tape was peeled off at once with a large force, and the peeled-off surface was observed.

A: No change observed on the resin layer.

B: Only the surface layer of the resin layer was peeled off, or the conductive agent was adhered on the surface of the peeled off tape.

C: The resin layer was partly or entirely peeled off from the aluminum surface.

<Measurement of Solvent Resistance>

The sample was immersed in NMP solution for 60 seconds at ambient temperature. The sample was taken out from the NMP solution, and then the NMP remaining on the surface was wiped off quickly. Scratch test was carried out immediately after. A 2-pond hammer with 10-fold gauze was reciprocated, and the times of reciprocation until change was observed in the resin layer (decolorization, peel off, decrease in resin thickness) was counted. The maximum times of reciprocation was 20.

<Discussion>

All of the Examples had low electrical resistance at ambient temperature, and the electrical resistance rose as the temperature was elevated. Accordingly, the shut down function was appropriately achieved. In addition, adhesion property and solvent resistance were also superior.

In Comparative Example 1, the number of contacting points of the conductive agent was small due to the excessively small formulation amount of the conductive agent. Accordingly, the electrical resistance at ambient temperature was high.

In Comparative Example 2, the contact between the conductive agent at elevated temperature was maintained due to the excess formulation amount of the conductive agent. Accordingly, the shut down function was not appropriately achieved. In addition, the adhesion property and the solvent resistance were not superior.

In comparative Example 3, the average particle diameter of the thermoplastic resin particle was too small, and thus the shut down function was not appropriately achieved.

In Comparative Example 4, the average particle diameter of the thermoplastic resin powder was too large, and thus the electrical resistance at ambient temperature was high. In addition, the adhesion property and the solvent resistance were not superior.

In Comparative Example 5, the formulation amount of the thermoplastic resin powder was excessively small, and thus the shut down function was not appropriately achieved.

In Comparative Example 6, since the formulation amount of the thermoplastic resin powder was excessively large, the area of the thermosetting resin was small. Accordingly, the adhesion property of the resin layer was insufficient the solvent resistance decreased.

In Comparative Example 7, the formulation amount of the hardening agent was excessively small, and thus the hardening of the thermosetting resin base material was insufficient. Accordingly, the characteristics of the thermosetting resin base material were substantially those of the thermoplastic resin, thereby resulting in unfavorable adhesion property and solvent resistance.

EXPLANATION OF SYMBOLS

1: current collector
3: conductive substrate
5: resin layer (resin layer for current collector)
7: thermosetting resin base material
11: conductive agent
13: thermoplastic resin particle
15: active material layer or electrode material layer
17: electrode structure

The invention claimed is:

1. A current collector having a resin layer on at least one side of a conductive substrate, wherein:
thermoplastic resin particles substantially free of a conductive agent are dispersed in a thermosetting resin base material containing particles of conductive agent to structure the resin layer, wherein the thermoplastic resin particles substantially free of a conducting agent do not provide a conductive pathway for electrons via the thermoplastic resin particles;
a value of mass ratio given by (thermoplastic resin particles)/(conductive agent) is 0.3 to 1.5;
a value given by (average thickness of conductive agent)/(average thickness of thermoplastic resin particles) is 0.3 to 4.0; and
a value given by (average thickness of thermoplastic resin particles)/(average thickness of thermosetting resin base material) is 1.0 to 3.0;
wherein the thermosetting resin base material containing the particles of conductive agent and the thermoplastic resin particles substantially free of a conductive agent have different thermal expansion coefficients, and the thermoplastic resin particles are configured to expand with an increase in temperature to sever a connection between the particles of conductive agent.

2. The current collector of claim 1, wherein a value given by (average thickness of conductive agent)/(average thickness of thermosetting resin base material) is 1.0 to 3.0.

3. The current collector of claim 1, wherein the thermoplastic resin particles are water-insoluble.

4. The current collector of claim 1, wherein a value of mass ratio given by (conductive agent)/(thermosetting resin base material) is 0.1 to 0.5.

5. The current collector of claim 1, wherein a value of mass ratio given by (thermoplastic resin particles)/(thermosetting resin base material) is 0.09 to 0.4.

6. The current collector of claim 1, wherein the thermosetting resin base material is formed from a resin composition comprising a thermosetting resin, a hardening agent, and particles of conductive agent.

7. The current collector of claim 6, wherein the thermosetting resin is a mixture or a copolymer containing at least one type of resin selected from the group consisting of a polyacrylic acid-based resin, a nitrocellulose-based resin, and a chitosan-based resin.

8. The current collector of claim 1, wherein the conductive agent comprises carbon black.

9. The current collector of claim 1, wherein the thermoplastic resin particles are one or more types of resin selected from the group consisting of polyethylene-based resin, polypropylene-based resin, polyvinylidene fluoride-based resin, polyvinyl butyral-based resin, and modified resins thereof.

10. An electrode structure comprising an active material layer or an electrode material layer on the resin layer of the current collector of claim 1.

11. A non-aqueous electrolyte battery or an electrical storage device comprising the electrode structure of claim 10.

12. A method for manufacturing a current collector according to claim 1, comprising the steps of:
applying a resin layer material on at least one side of a conductive substrate; and
baking the resin layer material at 120 to 230° C.; wherein the resin layer material comprises:
a thermosetting resin solution containing a thermosetting resin, a hardening agent and particles of conductive agent; and
thermoplastic resin particles dispersed in the thermosetting resin solution.

13. The method of claim 12, wherein the resin layer material is prepared by a method comprising the steps of:
(1) preparing an aqueous emulsion of the thermosetting resin;
(2) mixing the emulsion with particles of conductive agent;
(3) further adding the emulsion to the mixture obtained by step (2);
(4) adding the thermoplastic resin particles to the mixture obtained by step (3); and
(5) adding the hardening agent to the mixture obtained by step (4); wherein
the particles of conductive agent are added so that a value of mass ratio given by (conductive agent)/(thermosetting resin+hardening agent+conductive agent) is 0.1 to 0.5.

14. The method of claim 13, wherein the hardening agent is added so that a value of mass ratio of solid content given by (hardening agent)/(thermosetting resin) is 0.02 to 0.5.

* * * * *